No. 706,977. Patented Aug. 12, 1902.
H. L. MANSON & J. KAMPHUES.
STOCK AND DIE.
(Application filed May 5, 1902.)
(No Model.)
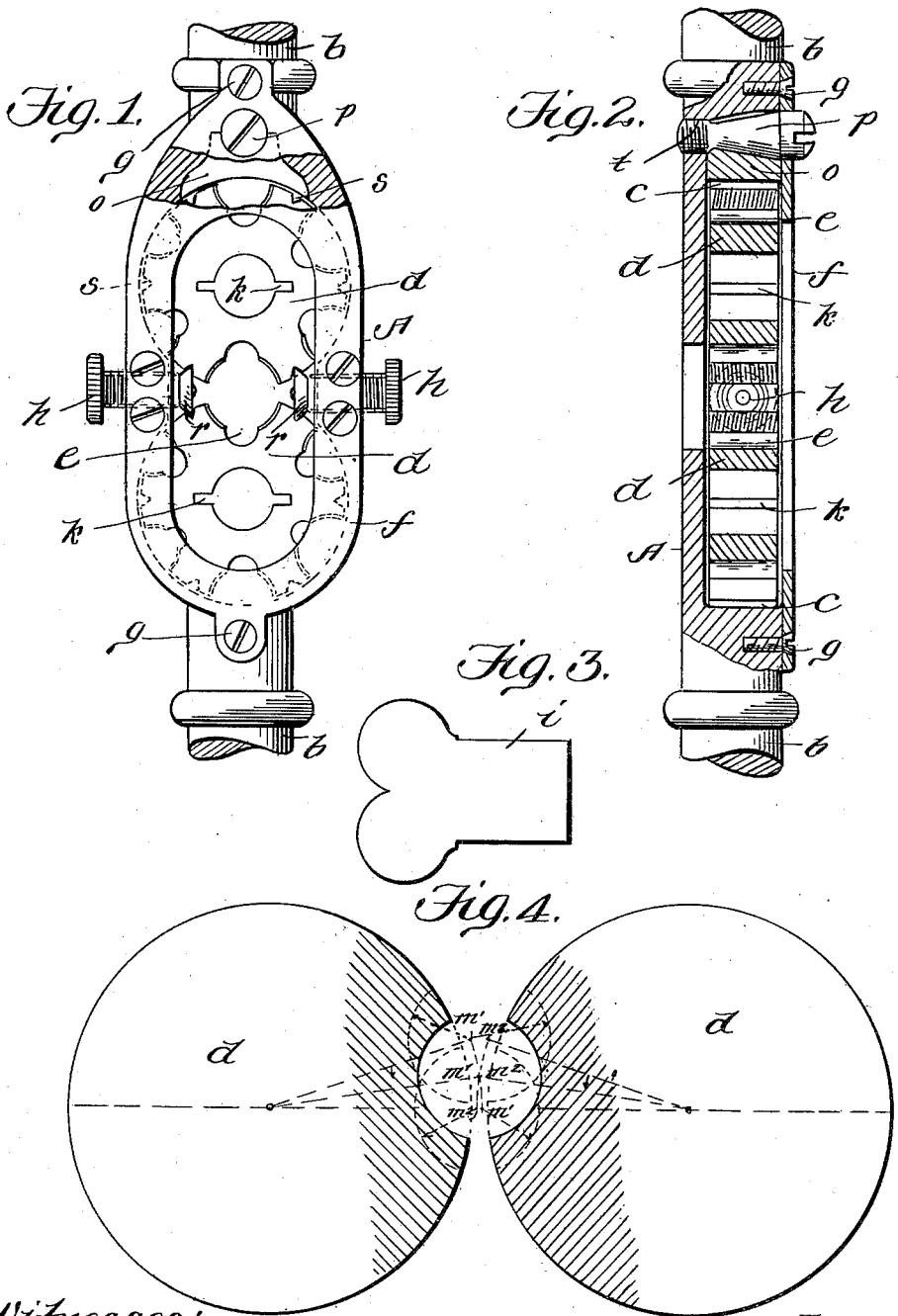
Witnesses:
C. L. Kesler
H. L. Bogan
Inventors
Henri L. Manson
Joseph Kamphues
By James L. Norris
Atty.

UNITED STATES PATENT OFFICE.

HENRI LOUIS MANSON AND JOSEPH KAMPHUES, OF AMSTERDAM, NETHERLANDS.

STOCK AND DIE.

SPECIFICATION forming part of Letters Patent No. 706,977, dated August 12, 1902.

Application filed May 5, 1902. Serial No. 106,029. (No model.)

*To all whom it may concern:*

Be it known that we, HENRI LOUIS MANSON, mechanist, residing at Gerard Brandstraat 22, and JOSEPH KAMPHUES, mechanist, residing at Reguliersdwarsstraat 68, Amsterdam, Netherlands, subjects of the Queen of the Netherlands, have invented certain new and useful Improvements in Stocks and Dies, of which the following is a specification.

This invention has for its object a screw-cutting die-stock having two mutually-adjustable die-plates provided with several pairs of screw-cutting jaws, which plates are so arranged that by means of side screws, which engage in notches in the cutting-plates, they may be fixed in the desired positions and adjusted in such a way that the cutting-openings between the pair of jaws working in conjunction may be enlarged or reduced, according to the direction in which the jaws are moved by means of the screws.

In the arrangements hitherto employed it has not been possible to firmly and uniformly adjust the cutters or cutting-jaws, especially when the pins employed for that object and the holes in the periphery of the jaws have become worn, which soon takes place in consequence of the heavy work involved in these known arrangements. In the present invention the adjusting-screws are moved as near as possible to the cutting-jaws, so that the strain is borne in a favorable manner and they wear away only to an extremely small extent, because the jaws during the boring of the cutting-opening are so adjusted that the center of the bore lies somewhat above the connecting-line of the centers of both cutter-plates, and this arrangement further allows of the size of the cutting-openings being adjusted and varied.

In the accompanying drawings, Figure 1 is a front view, partly in section, of the cutting stock and die. Fig. 2 is a side view of the same in longitudinal section, and Fig. 3 is a detail view of a key for moving the cutting-plates, while Fig. 4 is a diagram of action which takes place in adjusting the cutting-opening.

A stock-plate having two handles $b$ is provided at each side of its center with a flat circular recess or indentation $c$, in which recesses the cutting plates or dies $d$ are located. In the periphery of the cutting plates or dies $d$, which are made of steel, screw-threaded notches or jaws are cut at six places, in the present instance for cutting threads of one-fourth, five-sixteenths, three-eighths, seven-sixteenths, one-half, and nine-sixteenths of an inch. In order to facilitate the cutting, indentations $e$ are formed in the die-plates in the ordinary manner. To allow of the insertion of the die-plates in the recesses $c$, the latter are open on one side and are closed by a cover-plate $f$, which is open in the center and is fixed on the body of the screw-plate by means of small screws $g$, whereby the dies or cutting plates are prevented from falling out. The dies can turn freely in the recesses $c$ and are fixed during the thread-cutting by two side screws $h$, having conical wheels $r$ at their ends, which engage in notches $s$ on the edges of the dies. For adjusting the dies a key $i$ is employed, which is inserted in a slot $k$ in the dies. The screws $h$, which hold fast the dies $d$, also serve for enlarging or diminishing the cutting-opening. This alteration of the cutting-opening may be effected by the center point of the cutting-opening being displaced by means of the screws $h$. Fig. 4 shows the action of this displacement of the center point. The center point of the original normal bore of the cutting-opening lies outside the connecting-line of the center points of the two dies. If the two dies are moved by the screws $h$ in such a way that the center points $m'$ $m^2$ of the two semicircular notches of the cutting-openings previously lying on the same point move toward the connecting-line of the center points of the dies, the cutting-opening is a little reduced or narrowed as both semicircles move nearer to one another. A displacement of the dies out of the normal position in an opposite direction produces an enlargement of the cutting-opening as the center points $m'$ $m^2$, and thus both semicircles, move apart. This small alteration in the diameter of the cutting-opening suffices to alter the size of the thread to be cut.

In order to provide for the existing irregularity in the diameter of the bolts to be screwed, which necessitates the shifting of the dies *d* from or toward one another more than the screws *h* admit, we have provided a movable block *o* at one side of the screw-plate *a* in the recess *c*. This block *o* bears against the die *d* at its circumference and is provided at the opposite side with an oblique face, within which a conical screw-bolt *p* fits. The screw of the bolt *p* engages in an aperture *t*, formed in the bottom of the recess *c*. The side opposite to the block *o* bears against the vertical wall of the recess *c*. It will be seen that by screwing the bolt *p* down the block *o* and consequently the die *d* are moved downward toward the other die and that by this means the dies can be adjusted according to the diameter of the bolt to be screwed.

The cover-plate *f* is elongated and fastened by the screw *g* behind the screw-bolt.

We declare that what we claim is—

In a screw-cutting stock, the combination of a recessed stock-plate, two circular die-plates mounted in the recess in said plate and having several pairs of screw-cutting openings on their edges and notches between said screw-cutting openings, two adjusting-screws mounted in the sides of the stock-plate, and conical wheels on the inner ends of said adjusting-screws said conical wheels being adapted to simultaneously engage in the edges of both die-plates, whereby said plates may be adjusted and locked as required.

In testimony whereof we have hereunto set our hands in presence of two subscribing witnesses.

HENRI LOUIS MANSON.
JOSEPH KAMPHUES.

Witnesses:
THOMAS HERMANUS VERHAVE,
AUGUST SIEGFRIED DOCEN.